Aug. 27, 1963     C. E. JACKSON, SR     3,101,863
HERMETIC SEAL VALVE ASSEMBLIES
Filed Sept. 22, 1961     4 Sheets-Sheet 1
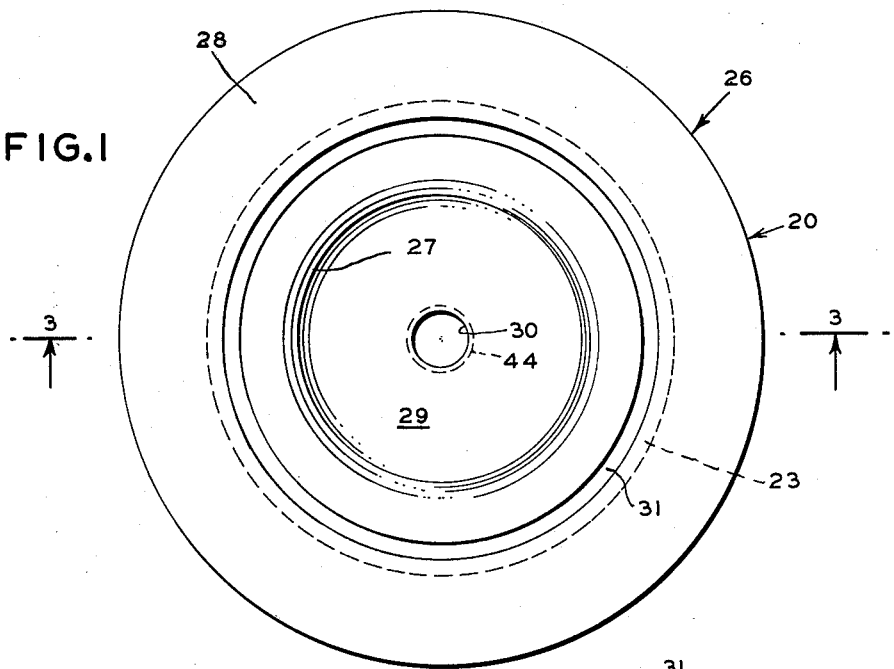
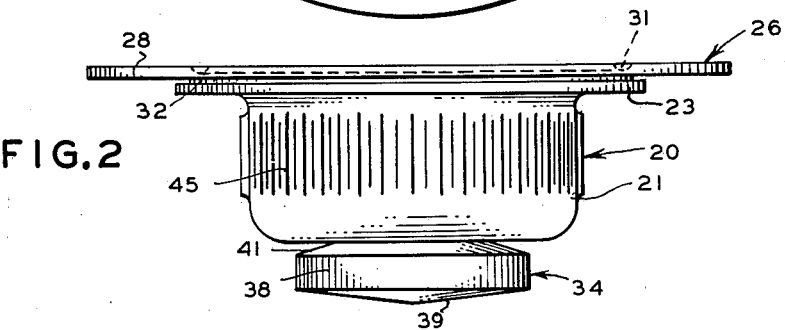
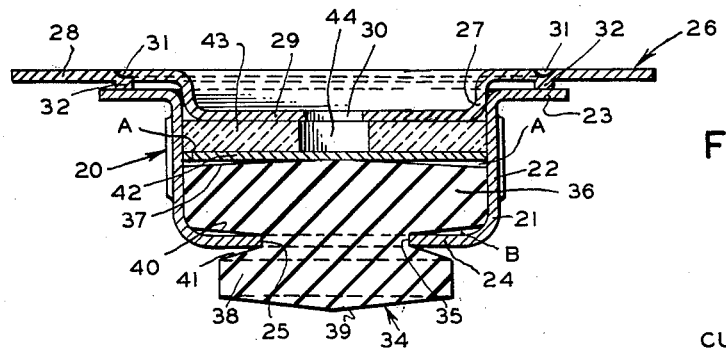
INVENTOR.
CURTISS E. JACKSON SR.
BY
AGENT

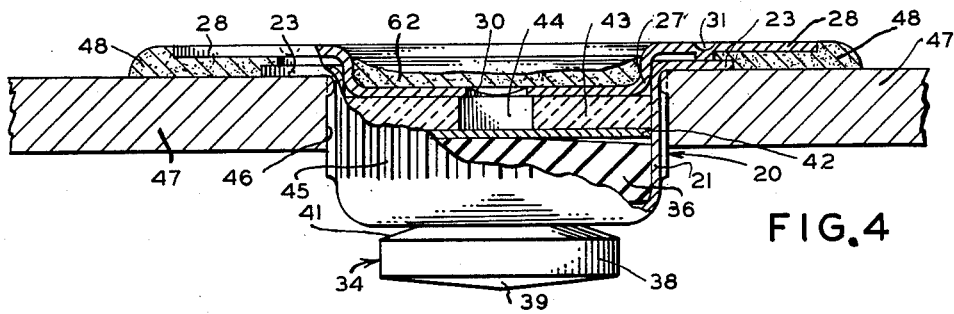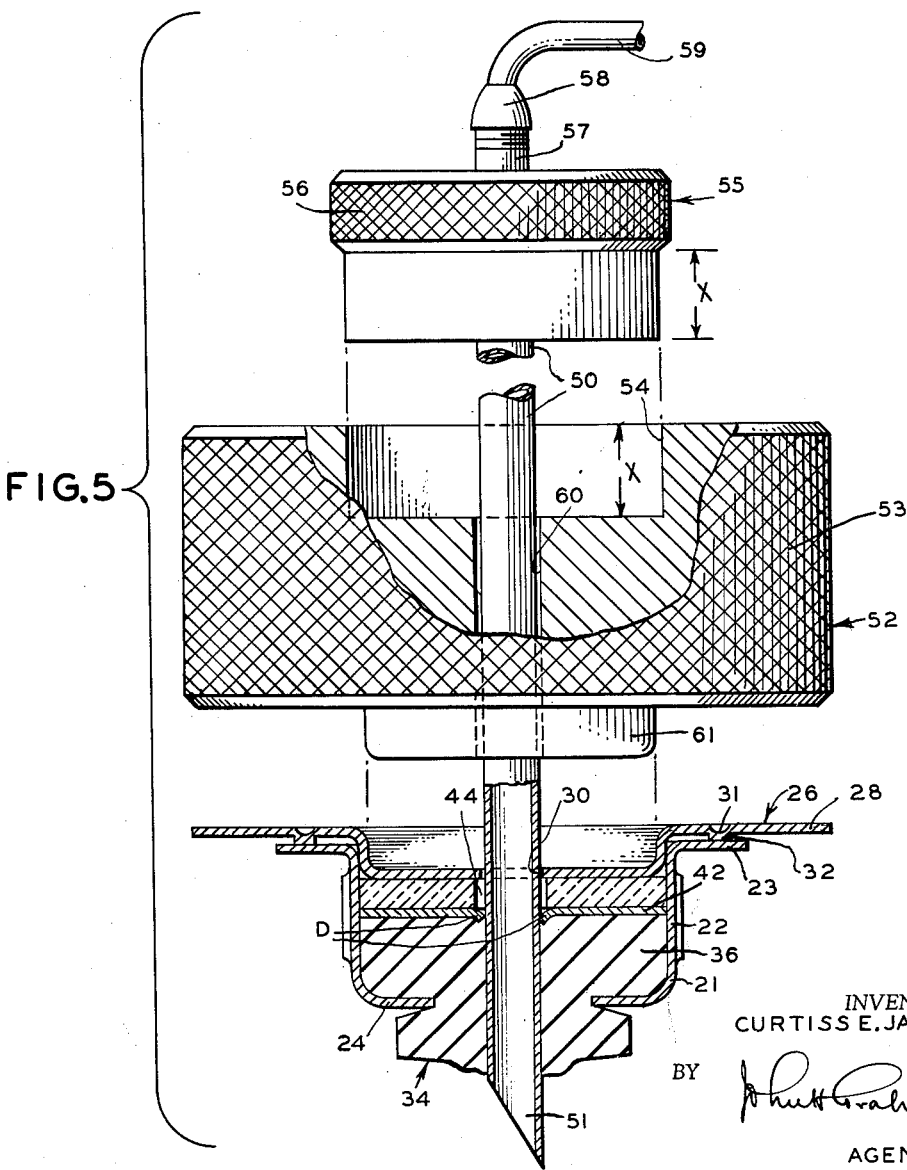

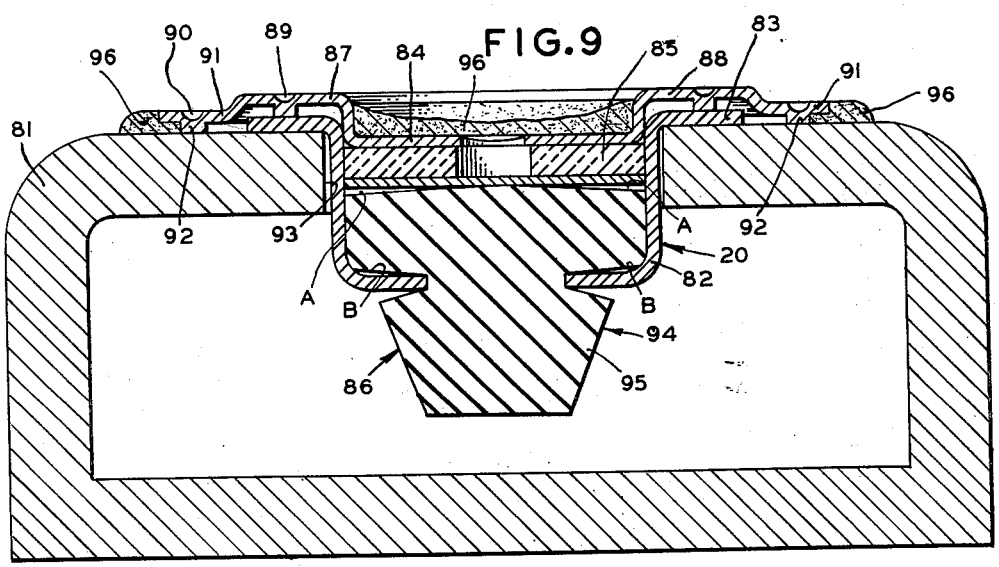
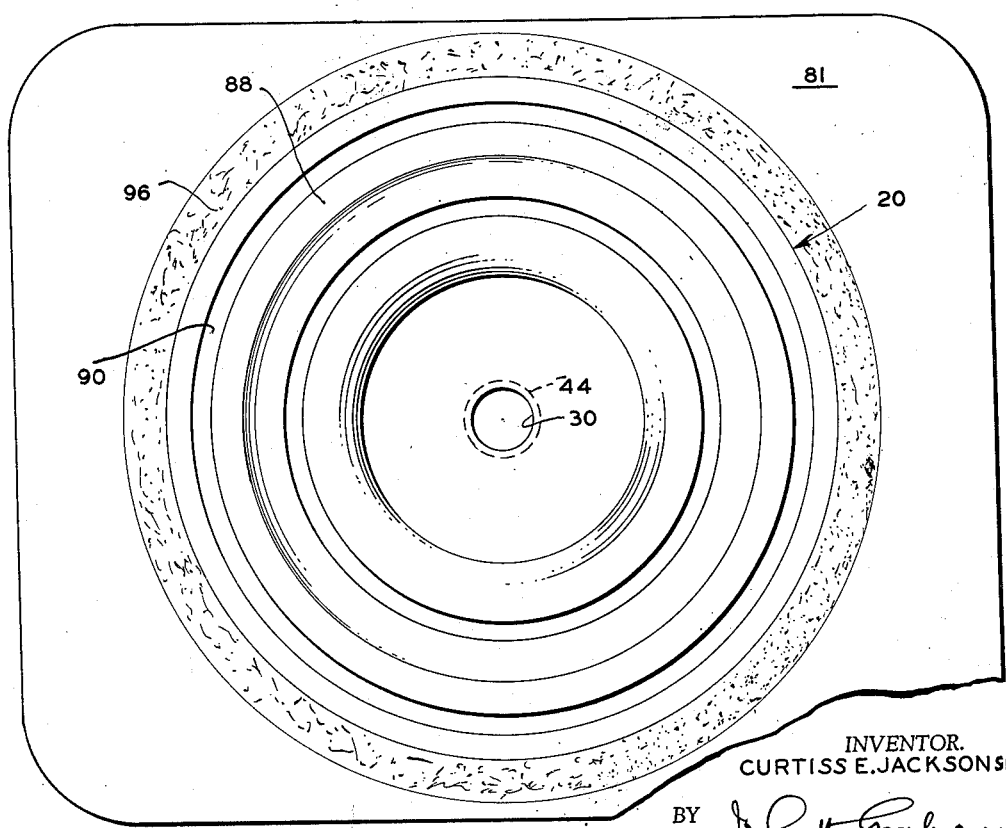

United States Patent Office 3,101,863
Patented Aug. 27, 1963

3,101,863
HERMETIC SEAL VALVE ASSEMBLIES
Curtiss E. Jackson, Sr., 27 Park Lane, Essex Fells, N.J.
Filed Sept. 22, 1961, Ser. No. 140,057
15 Claims. (Cl. 220—44)

This invention relates to hermetically sealed valve assemblies and to valves capable of being hermetically sealed. More particularly, it is concerned with such hermetically sealed valves as are used where the highest degree of sealing is obtained over a continuous period.

In many areas of modern industry, valves of this nature are in demand particularly when they may be made of small size to accommodate the sealing-off of cans and enclosures for delicate electronic equipment under vacuum. In many such applications, it is desired to fill the evacuated enclosure with an inert gas and once filled, it is necessary to maintain this inert gas pressure for long periods of time if the instrumentation associated with the enclosed equipment is to function at peak performance. Furthermore, it is highly desirable in such forms of sealed enclosures to be able to periodically check the content of the enclosure to make sure it is up to its necessary analysis for operation without contamination of the internal environment.

It is therefore the main object of the present invention to provide a hermetic sealing valve, particularly capable of being made of small size, for use with an enclosure for an electronic or like unit, where the internal atmosphere of the enclosure can be maintained at the desired level, and changes due to transmigration or leaking of media from the vessel are obviated while also permitting check of the interior environment and replenishment or change thereof, at will.

Other objects of the invention will become apparent from the accompanying description of the several modifications of the invention taken with the accompanying drawings, in which:

FIGURE 1 is a view in plan of a first form of the hermetic seal valve, according to the present invention;

FIGURE 2 is an elevational view of the hermetic seal valve of FIG. 1;

FIGURE 3 is a cross-sectional view of the valve of FIG. 1, taken on the lines 3—3 of FIGURE 1;

FIGURE 4 is an elevational view, with parts in section, showing the basic attachment means for securing the valve of FIG. 1 in typical attachment of the valve to the wall of an enclosure;

FIGURE 5 is an exploded composite view, partly in section, of the valve equivalent to the illustrated form in FIG. 3 but with the external operating device for emptying and charging the enclosure associated with the valve of FIG. 1, according to the invention, shown in its operative position relative to the valve;

FIGURE 9 is a cross-sectional elevation of the valve according to FIG. 8 of the invention as completely assembled within an enclosure;

FIGURE 10 is a plan view of the enclosure and valve of FIG. 9 showing details of the sealing-off assembly.

Figure 6:
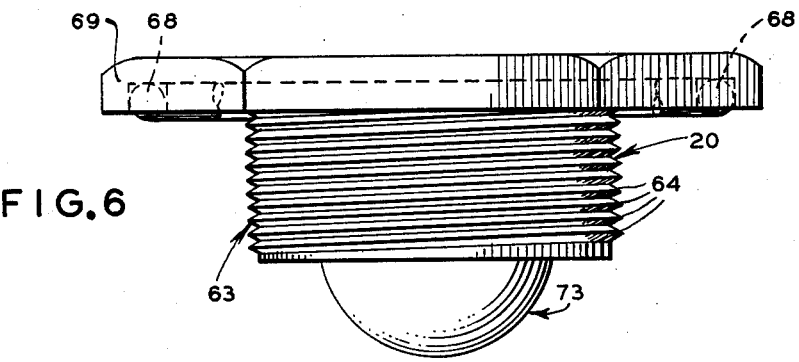
FIGURE 6 illustrates, in elevation, a modified form, as a second embodiment of the invention, of the hermetic seal valve of the present invention.

Referring now to the form of the invention illustrated in FIGURES 1 to 3, the hermetic seal valve of the present invention is generally indicated at 20, as a finished unit ready for installation in a container, closure or like device, as will be hereinafter described.

The unit 20 comprises a main shell or housing 21 having a cylindrical body 22, an integral flange 23 projecting externally from an open end of the body 22 at right angles to the axis thereof, and an integral closure 24 at the closed end of the body 22 which has a central bore 25 therethrough, thus defining a deep, dish-shaped housing 21 with a circular hole 25 in the bottom thereof.

Associated with shell 21 is a cover generally shown at 26 which is also of general dished contour and which comprises a shallow cylindrical body 27, a wide externally projecting flange 28 from an open end of body 27, a closure 29 for the closed end of body 27 and a bore 30 centrally located in the closure 29.

As will be clearly seen from FIG. 3, flange 28 is much wider than flange 23, for the purpose hereinafter described. Also, the external diameter of cylindrical body 27 is substantially the same as the internal diameter of the cylindrical body 22 whereby the cover 26 can be located and held in position within the upper open end of shell 21 by nesting as illustrated.

Ultimately, the cover 26 is to be positively attached to the shell 21 and to this end, in the form of FIGS. 1 to 3, the flange 28 has an indented ring 31 with a depending upset 32 which can permit an electrical resistance weld to be simply made when ultimate permanent assembly of shell 21 and cover 26 is desired. The upset 32 registers the cover 26 with shell 21 with the cylindrical body 27 nested in the cylindrical body 22 and flanges 23 and 28 are then parallel and proximate and cover 26 is aligned and held for welding onto shell 21. While the cover and housing are shown attached together by welding using an indented ring for resistance welding, it is obvious that other means can be used for attaching the flanges 23 and 28 of the housing and cover together to make up the valve assembly.

Located partly within and partly protruding from the bore 25 in shell 21, there is located a hermetically sealing member which comprises a specific shape of an elastic material, such as rubber, in the form of a double-ended plug generally shown at 34, having a narrowed section or neck 35 which engages the bore 25, an upper end 36 which is generally cylindrical and closely fits at its periphery within the interior of cylindrical body 22 and has an upper surface 37 which is conical in shape and a lower end 38 which is also generally cylindrical and projects beyond the shell 21. It will be noted that the lowermost face of end 38 is a cone, as at 39 and also both ends 36 and 38 have, at the joint with neck 35, tapered faces 40 and 41, whereby the element 34 comprises a neck 35 and two plugs 36 and 38 each being of cylindrical contour and with conical faces. By this means, there is left within the shell 21 certain air spaces shown at A and B in FIG. 3. Also, a space C is defined between plug 38 and the outer surface of shell 21. Any or all of these spaces are preferable for the present invention when using a form thereof defined by FIGS. 1 to 3, as will be brought out hereinafter.

Located above the upper conical surface 37 of plug 36 there is arranged a disc of thermal insulation forming a solid thermal barrier 42. The material forming barrier 42 is preferably hot pressed asbestos but other similar materials can be used, as long as they are soft enough to be penetrated by a sharp pointed device. The purpose of this barrier 42 is to isolate and insulate the element 34 from external heat, as hereafter described. Barrier 42 is a relatively thin, solid membrane without any puncture or orifice therein and it is pressed into place within cylindrical body 22 and into contact with the apex of conical face 37.

Above barrier 42 there is placed a second thermal barrier 43 formed as a washer with a circular orifice 44 substantially of the same diameter or a little greater in diameter, than orifice 30 in cover 26. The thickness of the washer of thermal barrier 43 is determined so that the cover 26 will contact same when in assembled position, as shown in FIG. 3. The substance forming washer 43 may be hot pressed asbestos, glass, silicones, ceramics or some of the thermally stable, low conductivity plastic materials, it being desired that washer 43 shall be flame retardant and thermally stable with low thermal conductivity. With the parts assembled as shown in FIG. 3, it is only now necessary to subject the valve unit 20 to electrical resistance welding at the welding ring 31 for the unit to be made as one piece and this will then be as shown in FIGS. 1 and 2, as a hermetic seal valve, according to the invention. The weld produced between flanges 23 and 28 will, in effect, preserve the hermetic sealing property of the valve assembly. The unit, during welding, will have pressure exerted between cover 26 and shell 21, thereby pressing washer 43 and membrane 42 firmly against the upper face of plug 36, to reduce airspace A and spread the body of plug 36 into sealing contact with the interior of housing 21. Since such valves as just described can be made very small, it is preferred in this form of the invention to knurl the outer face of cylindrical body 22 as shown at 45, for ease of future insertion into a closure to be hermetically sealed.

Referring now to FIG. 4, there is shown the method of attaching and sealing in a hermetic seal valve assembly 20, according to the present invention. Utilizing the unit 20 according to FIGS. 1 to 3, it will be seen in FIG. 4 that there is provided an orifice 46 in a metal plate 47 into which unit 20 is inserted with the plug 34 extending into what would be the interior of a container, of which plate 47 would be one wall. The knurl 45 holds the unit 20 in place by press-fitting into orifice 47. The flanges 23 and 28 overlie the metal beyond orifice 46 and by the structure, provide an area into which solder 48 can be flowed. This will firmly seat and seal the unit 21 in plate 47. Alternatively, instead of solder there can be used cement, which will achieve the same purpose of sealing the valve assembly within the enclosure but without heat. Due, however, to the thermal barriers 42 and 43, use of heat for sealing is permitted since it will have little effect on the valve assembly 20.

With the valve assembly 20 in place in the wall of an enclosure, means are provided according to the invention, to exhaust the air from the enclosure and/or add an atmosphere of desired properties to the interior of the enclosure.

By this means, a positive pressure of a desired gas, such as an inert atmosphere of nitrogen or helium, can be obtained or alternatively a negative pressure, namely, a partial or substantially complete vacuum can be obtained. By virtue of the construction and operating parts of the valve assembly according to the invention, such pressures will be maintained substantially indefinitely, if desired. As an alternative feature, however, the atmosphere within the container can be checked for pressure and/or purity, replaced or replenished at will, without contact with the external atmosphere, by virtue of the construction and operation of the valve assembly according to the present invention.

To this end, means are provided for communicating with the interior of the closure, at will, through the valve assembly 20. As shown in the exploded view of FIG. 5, there is provided a hollow penetrator tube 50 which has a pointed terminal end 51 adapted to be passed by manual pressure through the solid barrier 42 and the double-ended plug element 34 under guided thrust. The main support for penetrator tube 50 is a cylindrical block 52 having a knurled outer surface 53 for easy gripping and being recessed as at 54 to receive a pressure grip 55 to which is attached penetrator tube 50. Grip 55 is partially knurled at 56 for a better grip and has protruding from its upper end the terminal 57 of the tube 50 to which a coupling 58 is attached carrying a flexible pipe 59.

Block 52 is bored at 60 to a diameter slightly greater than that of tube 50 so that tube 50 is an easy sliding fit in and through bore 60. Protruding below block 52 and formed to move therewith is a centering guide 61 which is formed as a cylinder of external diameter substantially equal to the internal diameter of cover 26 so that it can nest therein and act to center block 52 accurately relative to valve assembly 20.

Now, with block 52 aligned and centered by means of center guide 61, the penetrator tube 50 can be forced into and through the valve unit 20 as shown in FIG. 4 by pushing grip 55 into the recess 54 in block 52 in the manner of operating a syringe. The cover 26 is bored at 30 to allow passageway of the tube 50, as is also the washer thermal barrier 43 having a bore 44. Thermal barrier 42 is not bored but will be pierced by penetrator point 51 as shown in FIG. 4 at D. Also, the plug 34, being of rubber or like yielding, resilient material, will be pierced and ultimately the point 51 will go right through the plug 34 and into the interior of the enclosure. This is shown in FIG. 5. It is now possible to evacuate the atmosphere within the enclosure by attaching a vacuum line at coupling 58 and, due to the particular structure involved, a high degree of vacuum can be established in the enclosure. If, thereafter, it is desired to fill the evacuated enclosure with a desired atmosphere, such as inert gas, the coupling 58 only has to be connected to a source of the gas under pressure and the container can be filled. During periods of evacuation and filling there will be a complete sealing off of the penetrator tube 50 from the atmosphere by the double-ended plug 34, by virtue of its resiliency.

When the evacuation and/or filling of the enclosure has been completed to the desired point, the penetrator tube can be withdrawn by pulling same out using the grip 55. The hole caused by the insertion of penetrator tube 50 in the rubber plug 34 will seal up immediately so that, upon removal of the penetrator 50, the valve will hermetically seal off. This is in part due to the choice of material for the double-ended plug 34, self-sealing rubbers being well-known in the art, and in part by the particular construction of the upper plug 36. The cone face 37 leaves the spaces A which are filled up when the penetrator 50 is in position in the enclosure and upon removal, the spaces A will reappear and this will tend to close the hole made by penetration. The same applies to spaces B and cone faces 40.

However, while the airspaces are highly desirable, it should be realized that sufficient sealing can be obtained by correct choice of rubber-like material for plug 34. Synthetic and natural rubbers can be used, with or without plasticizers and modifiers. Various plastic elastomers are also capable of use for plug 34. Thus, there is a wide range of materials to suit the conditions of elasticity or of self-sealing needed and also to suit the chemical environment in which the sealing material may exist.

It is a further feature of the present invention that when the enclosure has been duly evacuated and the operation of hermetically sealing completed, a further physical seal is applied to ensure the complete and substantially permanent sealing of the enclosure. As shown in FIG. 4, after the container or enclosure has been completely treated, a layer of solder 62 is floated in liquid state in the well of the cover 26 to fill this up, when solidified, to substantially a flat surface with flange 28. The solder 62 will go down through the orifice in thermal barrier washer and the bore 30 in cover 26 and fill these up but the membrane thermal barrier 42 will prevent any heat from affecting the plug 34 therebelow. By this means, a permanent seal over the top of the whole valve assembly 20 is achieved. In place of solder, a plastic material can be used or a hard, dense curing adhesive such as epoxy cement. Also, if desired, a material may be used which can be removed, if or when the atmosphere in the enclosure is to be checked or changed. In such cases, a suitable thermoplastic material may be used which can be removed by heating to make it possible to re-enter the enclosure using the penetrator tube for any desired purpose.

Figure 7:
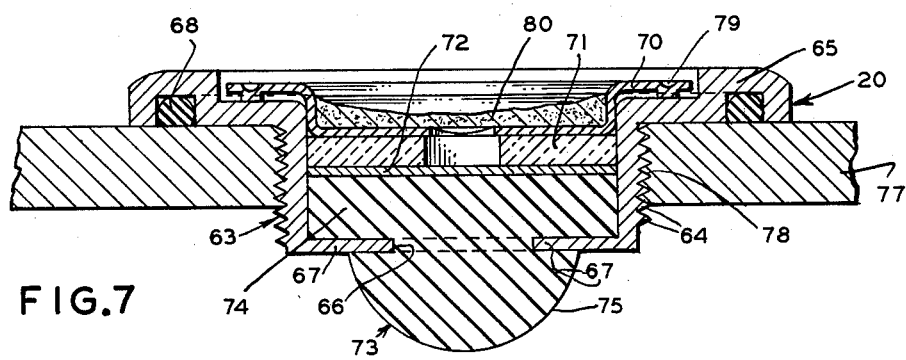
FIGURE 7 is an elevational view, with parts in section, of the valve according to FIG. 6 when assembled in position with a wall of an enclosure, showing the method of attachment and sealing.

FIGS. 6 and 7 illustrate a modified form of the valve assembly of the present invention. The valve assembly 20 of FIGS. 6 and 7 comprises a cylindrical housing 63 having an external machine thread thereon 64, an integral flange 65 extended outwardly at the open end and an orifice 66 in the closed end 67. Within a slot in the flange 65 there is arranged an O-ring of conventional form, shown at 68. The flange 65 is formed with a hexagonal head 69 best shown in FIG. 6, a section thereof being recessed to accommodate a cover 70 formed substantially identically to the cover 26 of FIGS. 1 to 3. The valve assembly of FIGS. 6 and 7 has equivalent parts to those of FIGS. 1 to 3 namely, a membrane thermal barrier 71, a washer thermal barrier 72 and a double-ended rubber plug 73. Plug 73 has an upper portion 74 having a contour to fit the internal area of housing 63 and outer portion 75 which is formed as a hemisphere with a groove 76 where the closure portion 67 fits. In this modification, the rubber plug 73 is vulcanized in the interior of housing 63 and no airspaces are left, since these are not needed with such bonding and sealing of the rubber plug 73 to the metal of housing 63.

In assembling this form of valve assembly 20 into a plate or wall 77 of an enclosure, the orifice into which the valve assembly 20 is to be placed is screw-threaded, as at 78, and the valve assembly is screwed in place to make a good sealed bond, using either a metal, rubber or plastic O-ring 68 to seal off flange 65. The cover 70 is attached as before-described by welding at 79 and the final seal is made by solder or cement 80 over the top of the valve assembly, after evacuation or equivalent servicing of the interior.

It will be readily seen that the embodiment shown in FIGS. 6 and 7 make it possible to remove the whole valve assembly 20 from the enclosure 77 at any time.

Figure 8:
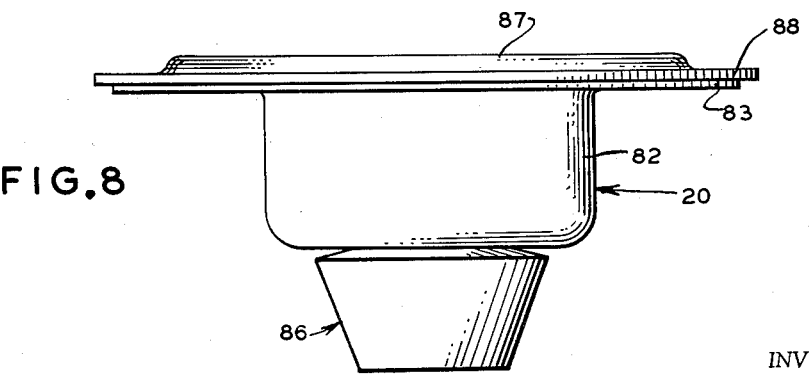
FIGURE 8 illustrates, in elevation, a further modified form as a third embodiment of the invention, of a hermetic seal valve of the present invention.

Another form of practicing the invention is shown in FIGS. 8, 9 and 10. In this embodiment, means are provided for making the best positive attachment of the valve assembly to the enclosure.

In FIGS. 9 and 10 a complete enclosure 81 is shown to which a form of valve assembly 20 according to the invention has been attached. The basic parts of the valve assembly 20 are similar to those of FIGS. 1 to 3 comprising a main housing 82 with a flange 83, a washer thermal barrier 84, a membrane thermal barrier 85 and a double-ended plug 86. The cylindrical cover 87 has a flange 88 extending at right angles to its axis, said flange having an indented ring 89 for resistance welding flanges 83 and 88 together and another indented ring 90 on a step-down section 91 of flange 88 which is adapted to contact the outer face of a wall of container 81 at points 92. Thus, the valve assembly 20 of FIG. 9 can be put together as previously described and can be welded into a unitary body at weld ring 89. Thereafter, the completed unit 20 can be inserted into the opening 93 of enclosure 81 and the weld at ring 90 can be made to form the enclosure 81 and valve assembly 20 as a unit. The body of the housing 82 is smooth in this embodiment, as shown in FIG. 8, so that the assembly can be made with a tight press fit of the valve housing 82 into orifice 93 of the enclosure.

In FIG. 8, the lower projecting plug 84 is shaped as a frusto-conical member 95 this being a preferred shape for plug 86 since it provides maximum pressure resistance normal to the pressures exerted by the insertion and withdrawal of the penetrator 50.

It should here be noted that the shape of the protruding plug in every case can be chosen to suit the demands and requirements of the present invention. In FIG. 9, the longer slope of the frustro-conical face 95 of plug end 94 allows pressure to be exerted thereon by the atmosphere inside the enclosure 81 normal to the line of resistance. When a vacuum is introduced into enclosure 81, the space areas B (see also FIG. 3) are reduced to zero and the seal off is made even more complete thereby. If, on the other hand, the enclosure 81 is pressurized by using an inert gas at pressure, then the spaces A (see also FIG. 3) are reduced to zero causing a maximum sealing. These actions also hold the penetrator tube 50 sealed during ingress or egress of gases and, as the tube 50 is withdrawn, the stresses so created in the rubber of the plug causes the puncture made by the tube 50 to seal simultaneously with extraction.

In FIG. 9, the valve assembly 20 is shown sealed off permanently by solder or the like 96 as previously described.

In each instance, the stresses created in the rubber or like elastomer forming the double-ended plug exert a force on the membrane thermal barrier which tend to close the puncture caused by penetration of tube 50.

Many modifications can be undertaken in connection with the valve assembly of the present invention without departing from the spirit and scope of the appended claims.

Materials chosen for the various seals and barriers can be selected to suit the particular use to which the device is to be put.

The hermetic sealing means of the present invention can seal off any container, closure, system or vessel by evacuation or by back-filling with a solid, liquid or gas and the desired internal phenomenon state can be retained for an indefinite period of time. Examination of the state within the enclosure can readily be made and corrected if need be. While the physical seal of the unit, after completion of all operations is identified as permanent or semi-permanent, obviously a temporary seal could be applied using a non-hardening plastic.

The term "hermetically sealed" as used herein is defined as the ability of any matter or integral combinations of materials, so joined together as to be capable of restraining the passage of a media whether solid, liquid or gaseous. A typical example is the ability of a container or vessel to retain its internal phenomenon state, and to prevent changes in this state due to transmigration or leaking of the media through the enjoined walls of the container or vessel, which would result in a change of the state of the internal phenomenon. A container or vessel and any integral parts thereof may be considered to be in a state of hermetic seal, when all of the walls of the container and/or any of its orifices are so restraining that they will not pass more than one cubic centimeter of helium gas within a period of 1 year per linear inch of enjoined seal length. In practicing the present invention, sealing has been accomplished to assure a positive seal when tested at $1 \times 10^{-6}$ mm. Hg on the helium mass-spectrometer.

Thus, there is provided by the present invention a valve assembly capable of use for hermetic sealing of containers with an indefinite life of maintenance of the internal phenomenon state. The valve assembly is easy to make and simple in operation. The valve assembly takes up a minimum of space and does not protrude materially above the enclosure. It permits ready positive or negative pressure application to the enclosure, when installed and particularly is adapted to permit sampling and examination of contents and replenishment thereof when needed. It can be used for chemical, electronic, biological, medical and general industrial use whenever it is desired to produce or sample a controlled environment within a sealed vessel, system, container or closure.

Due to the particular construction of the valve assembly according to this invention, it will be seen that the interior state of the enclosure used with the valve assembly is not exposed to the atmosphere when the interior state is created or checked or modified and this interior state is isolated from the atmosphere and never exposed thereto at any time while the hermetic sealing valve is actively associated with the enclosure. This is particularly of use with biological and medical preparations.

While the housing or shell 21 has been shown as a separate element for assembling therein of the parts which form the valve assembly, it is obvious that this shell 21 could first be installed, as by welding, in the body of the enclosure, after which the parts could be assembled within the shell. In like manner, the shell 21 could be physically formed integral with the body of the enclosure as by drawing when using metal.

Similar modifications in the form, structure and materials of the valve assembly according to the present invention may be made within the scope and limits of the appended claims.

What I claim is:

1. A hermetic seal valve assembly comprising a housing having a circular body, an integral flange projecting at right angles to the axis of the body at one end, a closure with an aperture therethrough at the other end, a resilient plug, part within the interior of said housing and part projecting through and beyond said aperture; a thermal barrier overlying said plug within said housing; a cover having a circular body, an integral flange projecting at right angles from an open end thereof and a closure with an aperture therethrough at the other end; said cover resting within said housing and means for heat-sealing said flanges together to form said cover and housing as a unit, said thermal barrier comprising a thin membrane of insulating material having an uninterrupted form and a separate thick washer of thermal insulating material, forming a permanent heat sealing of said valve assembly.

2. A hermetic seal valve assembly for an enclosure to be hermetically sealed comprising in combination a housing formed with a cylindrical body open at one end with a flange projecting outwardly from the body and a closed end having a circular bore centrally thereof; an apertured closure for the open end of said housing; a resilient plug having one part housed within said housing and another part protruding externally of the housing through the circular bore in the closed end, said plug being self-sealing after puncturing with a sharp tool, means to attach said closure to said housing to form a unit and means to attach said unit to an enclosure, said apertured closure being dished in its center area to provide a retaining ring into which a normally solid sealing compound can be poured in liquid state to close the aperture in said closure and there is provided a thermal barrier beneath said closure to permit of heating said sealing compound without adversely affecting said plug.

3. The valve assembly according to claim 2 wherein said plug has the part within said housing vulcanized in position therein to effectively seal the interior of said housing and said housing has its exterior knurled for assisting attachment to said enclosure.

4. The valve assembly according to claim 2 wherein said closure is attached to the flange of said housing body by means of a projecting depending ring of metal below said closure which is in contact with the upper face of said housing body and which can be welded in position to form a hermetic seal between said closure and said housing body.

5. The valve assembly according to claim 2 wherein said housing has an external machine thread thereon to permit attachment to said enclosure by screw threading, the flange on said body being formed as a hexagonal nut for assisting such attachment.

6. The valve assembly according to claim 2 wherein said plug has the part within said housing formed as a cylinder with outwardly protruding conical ends, to provide air spaces within said housing and permit said plug part within said housing to move into contact with either closed end or with the closure member.

7. The valve assembly according to claim 6 in which the protruding part of the plug is also formed as a cylinder with outwardly projecting conical ends.

8. The valve assembly according to claim 6 in which the protruding part of the plug is formed as a depending frustro-conical shape.

9. A hermetically sealed unit comprising in combination an enclosure and a valve assembly, said valve assembly comprising a housing formed with a cylindrical body, an apertured closed end and a protruding flange extending away from the body and normal to the axis thereof; a closure for the open end of said housing having a cylindrical body, an apertured closed end and a protruding flange extending away from its body and normal to the axis thereof; a resilient sealing plug within said housing having a portion extending through the aperture in said closed end, a thermal barrier between said plug and said closure, means for permanently attaching said housing flange and closure flange together and means for attaching said housing to said closure, said aperture in the closure being sealed over with a normally solid material applied in liquid state, and said thermal barrier comprises a heat insulating washer placed between said closure and an apertured thermal barrier disc of heat insulating material, forming a permanent heat seal.

10. The unit according to claim 9 wherein the normally solid material applied in liquid state is solder.

11. The unit according to claim 9 wherein said sealing plug is formed of self-sealing elastomer which can repair a puncture therethrough.

12. The unit of claim 9 wherein the seal plug within the housing is formed as a cylinder with outwardly projecting conical ends, leaving air spaces between said ends and the closed end of said housing and said closure, whereby the plug will move into sealing position within the housing whether vacuum or superatmospheric pressure exists in said enclosure.

13. The unit according to claim 9 wherein said closure is formed to nest within said housing with the closure and housing flanges in contact and welded together and said closure body is dished to act as a centering guide to permit a penetrator to be passed in guided fashion through said hole in said closure, through said resilient plug and thermal barrier and into the interior of said enclosure, for evacuation or back-filling of said enclosure, said resilient plug being formed of material which will self-seal after puncture of said penetrator, and wherein after such evacuation or back-fill, the aperture in said closure is sealed over with solder.

14. A hermetic seal valve assembly comprising a housing formed of a cylindrical body, an apertured closed end and an open end with a flange extending therefrom normal to the axis of said body, a closure for said housings at its open end formed of a cylindrical body, an apertured closed end, and an open end with a flange extending normal to the axis of said body, the outside diameter of said body being of a size to permit same to nest within the open end of said housing body, with said flanges in contact, means for attaching said flanges together, including an indented ring and an upset therebelow on said closure flange for electrical resistance welding to form a unitary housing and closure, a resilient rubber seal member formed of two cylindrical plugs and a connecting neck with conical faces at the ends of the plugs and at the neck, one plug being housed within said housing body and the other plug extending through the apertured closed end thereof, a solid thermal barrier disc covering the surface of the plug within said barrier, and a thermal barrier washer over said disc with the hole therein aligning with the aperture in said closure closed end, whereby a penetrator tube may be guided and inserted into and through said seal member and thereafter removed.

15. A hermetic seal valve assembly comprising a housing formed of a cylindrical body, an apertured closed end and an open end with a flange extending therefrom normal to the axis of said body, a closure for said housing at its open end formed of a cylindrical body, an apertured closed end and an open end with a flange extending normal to the axis of said body, the outside diameter of said closure body being of a diameter to permit same to nest within the open end of said housing body, with said flanges in contact; means for attaching said flanges together to form a unitary housing and closure; a resilient rubber seal member formed of two cylindrical plugs and a connecting neck, one plug being housed within said housing body and the other plug extending through the apertured closed end thereof, a solid thermal barrier disc covering the surface of the plug within the said barrier and a thermal barrier washer over said disc, the hole therein aligning with the aperture in said closure closed end, whereby a penetrator may be guided and inserted into and through said seal member and thereafter removed.

References Cited in the file of this patent
UNITED STATES PATENTS

| | | |
|---|---|---|
| 1,616,274 | Mulford | Feb. 1, 1927 |
| 2,416,900 | Busby | Mar. 4, 1947 |